United States Patent
Woodall et al.

(12)

(10) Patent No.: US 10,792,593 B2
(45) Date of Patent: Oct. 6, 2020

(54) METHOD FOR THE DE-AERATION OF FROTHS AND FOAMS

(71) Applicant: GLENCORE TECHNOLOGY PTY LTD, Brisbane (AU)

(72) Inventors: Peter Woodall, Mount Isa (AU); Daniel Smith, Carina (AU); Brendan Scott Smith, O'Halloran Hill (AU)

(73) Assignee: GLENCORE TECHNOLOGY PTY LTD, Brisbane, QLD (AU)

( * ) Notice: Subject to any disclaimer, the term of this patent is extended or adjusted under 35 U.S.C. 154(b) by 0 days.

(21) Appl. No.: 16/098,720

(22) PCT Filed: May 22, 2017

(86) PCT No.: PCT/AU2017/050477
§ 371 (c)(1),
(2) Date: Nov. 2, 2018

(87) PCT Pub. No.: WO2017/201571
PCT Pub. Date: Nov. 30, 2017

(65) Prior Publication Data
US 2019/0118116 A1    Apr. 25, 2019

(30) Foreign Application Priority Data

May 24, 2016    (AU) .............................. 2016901965

(51) Int. Cl.
*B01D 19/00*    (2006.01)
*B01D 19/02*    (2006.01)
*C02F 1/20*    (2006.01)

(52) U.S. Cl.
CPC ......... *B01D 19/02* (2013.01); *B01D 19/0042* (2013.01); *B01D 19/0094* (2013.01); *C02F 1/20* (2013.01)

(58) Field of Classification Search
CPC ...................................................... B01D 19/02
See application file for complete search history.

(56) References Cited

U.S. PATENT DOCUMENTS 4,936,744 A    6/1990    Dosch et al.
5,127,959 A *  7/1992    Grainer .................. B01D 19/02
                                                        134/21

(Continued)

FOREIGN PATENT DOCUMENTS

DE          225 3 422 A1    5/1974
DE        102011077629 A1   12/2011
(Continued)

OTHER PUBLICATIONS

International Search Report and Written Opinion, Appl. PCT/AU2017/050477, dated Aug. 24, 2017.
(Continued)

*Primary Examiner* — Amber R Orlando
*Assistant Examiner* — Phillip Y Shao
(74) *Attorney, Agent, or Firm* — Winston & Strawn LLP

(57) ABSTRACT

A method for removing gas from a froth by supplying at least a portion of the froth from a vessel into a housing, providing a flow of fluid through the housing, introducing the froth into the fluid such that at least a portion of the gas in the froth is removed from the froth and entrained in the fluid to form a mixture of fluid and entrained gas and subsequently delivering the mixture to the vessel and/or another location within a processing circuit.

19 Claims, 2 Drawing Sheets

(56) References Cited

U.S. PATENT DOCUMENTS

| | | | | |
|---|---|---|---|---|
| 5,525,242 A * | 6/1996 | Kerecz | ............... | B01F 3/04099 |
| | | | | 210/220 |
| 6,080,320 A * | 6/2000 | von Phul | ........... | B01D 19/0005 |
| | | | | 202/264 |
| 6,193,893 B1 * | 2/2001 | Mazzei | .............. | B01D 17/0205 |
| | | | | 210/702 |
| 7,374,602 B2 * | 5/2008 | McNulty | ............ | B01D 19/0005 |
| | | | | 95/245 |
| 2010/0176062 A1 | 7/2010 | Kanel et al. | | |
| 2011/0174159 A1 | 7/2011 | Swantner et al. | | |
| 2015/0321123 A1 | 11/2015 | Tabikh et al. | | |

FOREIGN PATENT DOCUMENTS

| | | |
|---|---|---|
| EP | 0634198 A1 | 1/1995 |
| KR | 10-2014-0025062 A | 3/2014 |
| KR | 10-2015-0066979 A | 6/2015 |

OTHER PUBLICATIONS

European Search Report EP17801831.3 dated Oct. 16, 2019.
EP Office Action, Applicantion No. EP17801831.3 dated Jul. 20, 2020.

* cited by examiner

METHOD FOR THE DE-AERATION OF FROTHS AND FOAMS

This application is a 371 filing of International Patent Application PCT/AU2017/050477 filed May 24, 2017, which claims the benefit of Australian application no. 201601965 filed May 22, 2016.

TECHNICAL FIELD

The present invention relates to a method for the de-aeration of froths and foams.

BACKGROUND ART

In many industrial processes, including those used in mineral processing, brewing and pharmaceutical production, froths and foams are generated as part of the process.

These froths and foams (hereinafter referred to collectively as "froths" for simplicity) can create problems within a process circuit, particularly when the froth is overly-stable. In these situations, the high air content in a froth can make pumping the froth to different locations within the circuit difficult. In addition, overly-stable froths can build up in, and overflow from, process vessels. Not only does this create mess, but it also can result in loss and/or contamination of product.

Some attempts have been made to overcome these problems. For instance, in some mineral processing froth flotation pumpboxes, impellers are used to physically burst bubbles in a froth, thereby reducing froth build-up and making pumping of the partially de-aerated froth easier. However, these impellers consume significant quantities of energy and require regular maintenance, making them relatively inefficient.

Other attempts to overcome the problems have been made, such as the use of centrifugal pumps that continuously remove air from a slurry stream as it builds up at the eye of the impeller. However, these pumps are of limited effectiveness when used to pump particularly stable or tenacious froths.

Thus, there would be an advantage if it were possible to provide a method for the de-aeration of froths that was both effective and energy-efficient.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for removing gas from froths, which may at least partially overcome at least one of the abovementioned disadvantages or provide the consumer with a useful or commercial choice.

With the foregoing in view, the present invention in one form, resides broadly in a method for removing gas from a froth comprising the steps of supplying at least a portion of the froth from a vessel into a housing, providing a flow of fluid through the housing, introducing the froth into the fluid such that at least a portion of the gas in the froth is removed from the froth and entrained in the fluid to form a mixture of fluid and entrained gas and subsequently delivering the mixture to the vessel and/or another location within a processing circuit.

The vessel may be of any suitable form. For instance, the vessel may be a processing vessel (such as a froth flotation cell, thickener, bioreactor, fermenter, pressure vessel, conditioning tank or the like) or may be a storage or holding vessel (such as a sump, tank, pond, pumpbox, reservoir or the like). Thus, the froth may be a mineral froth, a pharmaceutical froth, a brewing froth and so on.

In embodiments of the invention in which the vessel is a thickener, it is envisaged that the method of the present invention may be used to extract air from the thickener underflow stream. This may result in the improved performance of pumps adapted to pump the thickener underflow stream. In addition, this may result in the lowering of the yield stress and plastic viscosity of the stream.

The vessel may contain only froth, or may contain a mixture of liquid and froth. It is envisaged that, in some embodiments (such as in mineral processing applications), the vessel may comprise a slurry of solid particles in liquid topped with a froth (and particularly a mineral-laden froth). In other embodiments or applications, the vessel may comprise a liquid topped with a froth.

In these embodiments of the invention, particularly when the froth is overly stable, the transfer of the material in the vessel to another location in the processing circuit may be made more difficult by the presence of the froth. For instance, when attempting to pump a frothy material having a relatively high gas content, cavitation or air-locking may occur in the pump, leading to inefficient pumping and/or damage to the pump.

Froth may enter the housing from the vessel in any suitable manner. Preferably, however, the housing may include one or more openings through which froth enters the housing. Froth may enter the housing through the opening directly from the vessel, or may enter the housing via one or more conduits located between the vessel and the housing. For instance, the housing may comprise an inlet conduit associated with the housing. For instance, the inlet conduit may extend between the vessel and the opening, and froth may enter the housing through the inlet conduit.

In other embodiments of the invention, one or more intermediary pieces of equipment may be located between the vessel and the housing. For instance, in situations in which froth (or slurry having a froth component) is to be transferred between locations in a processing circuit, a pump may be located between the vessel and the housing. In this embodiment, it is envisaged that the froth may be transferred from the vessel to the pump, and then at least a portion of the froth may be extracted from the pump to the housing. The opening in the housing may be connected directly to the pump, or the housing may include an inlet conduit extending between the pump and the opening.

Froth may be extracted from any suitable part of a pump. It is envisaged, however, that the froth may be extracted from the casing of the pump. Thus, it is envisaged that the casing of the pump may be provided with one or more openings therein through which froth may be extracted. The exact location of the one or more openings is not critical, and the openings may be located on the inlet side of the pump casing, the motor side of the pump casing or a combination of the two. Further, the openings may be located at the rear of the pump or in the suction spool of the pump.

By way of background, pre-rotation occurs in the suction spool of a centrifugal pump when fluid in the suction spool begins to rotate prior to reaching the pump impeller. Typically, pre-rotation occurs when the pump is operated at less than about 80% of the best efficiency point (BEP) of the pump. It is conventionally considered that pre-rotation is undesirable as it significantly reduces the operating efficiency of the pump.

In the present invention, however, some advantages are created when conditions for pre-rotation are created in a suction spool from which froth is extracted. Specifically, the efficiency of extraction of gas from the froth in the suction spool is improved, as is pump performance due to removal of at least a portion of the gas from the froth prior to the froth reaching the pump.

Thus, in an embodiment of the present invention, the froth may be extracted from the suction spool of the pump. Froth may be extracted from any suitable point within the suction spool. For instance, froth may be extracted from adjacent the wall of the suction spool. More preferably, however, froth may be extracted from a point between the wall of the suction spool and the centre of the suction spool. Most preferably, froth may be extracted from the suction spool at a point at or adjacent the centre of the suction spool. It will be understood that the term centre of the suction spool is intended to refer to a point that is on or adjacent the centreline of the suction spool (i.e. the long axis of the suction spool).

Froth may be extracted from the suction spool using any suitable technique. In one embodiment, one or more inlet conduits extend into the suction spool in order to extract froth from within the suction spool. More preferably, the one or more inlet conduits extend to at or adjacent the centre of the suction spool such that the froth that is extracted from the suction spool through the inlet conduits is extracted from a point at or adjacent the centreline of the suction spool.

Thus, in another aspect, the invention resides broadly in a device for removing gas from a froth, the device comprising a housing including an inlet conduit adapted, at a first end thereof to be located in fluid communication with a suction spool of a pump, the housing further comprising a flow passage in fluid communication with an opposed second end of the inlet conduit, wherein, when a flow of liquid fluid is provided through the flow passage, the froth is introduced into the fluid through the inlet conduit such that at least a portion of the gas in the froth is removed from the froth and entrained in the liquid fluid to form a mixture of liquid fluid and entrained gas.

It is envisaged that the density of the fluid flowing through the housing may be greater than the density of the froth, largely due to the relatively high proportion of gas in the froth. This difference in density means that the froth is relatively easy to withdraw from the vessel and/or pump, thereby improving the efficiency of the operation of the present invention.

The pump may be of any suitable type. Preferably, however, the pump may be a centrifugal pump having an impeller.

Any suitable fluid may be used to create the flow of liquid through the housing. For instance, in some embodiments of the invention, the fluid may comprise a liquid such as water. However, it is also envisaged that the liquid could comprise a slurry (such as a mineral slurry, pharmaceutical slurry) or another liquid (such as an acid solution, base solution, chemical solution or the like). In brewing applications the liquid may comprise beer. In other embodiments of the invention, the fluid may comprise a gas or mixture of gases (such as air).

The flow of fluid may be at any suitable angle to the one or more openings in the housing and/or the inlet conduit. For instance, the flow of fluid may pass the opening and/or inlet conduit at an angle of 90° to the opening and/or inlet conduit (and particularly the second end of the inlet conduit). Alternatively, the flow of fluid may be obliquely transverse to the opening and/or inlet conduit. In this embodiment of the invention, the flow of fluid may pass the opening and/or inlet conduit at any suitable angle.

The angle at which the flow of fluid passes the opening and/or inlet conduit is not critical provided that the flow is sufficient to break the froth and entrain gas in the liquid. For instance, the flow of fluid may pass the opening and/or inlet conduit at an angle of between about 0° and 170°. More preferably, the flow of fluid may pass the opening and/or inlet conduit at an angle of about 25° and 155°. Even more preferably, the flow of fluid may pass the opening and/or inlet conduit at an angle of between about 45° and 135°.

In a preferred embodiment of the invention, the housing includes a flow passage through which the fluid flows. The flow passage may be of any suitable size or shape, although it is envisaged that the flow passage may include a restricted portion therein. Preferably, the diameter of the restricted portion is smaller than the diameter of the remainder of the flow passage. Preferably, the restricted portion is located between opposed ends of the flow passage.

In a preferred embodiment of the invention the opening may be located within the restricted portion of the flow passage. Thus, in this embodiment of the invention, it is envisaged that the froth may be drawn into the flow passage through the creation of a low pressure zone or partial vacuum in the flow passage or inlet conduit. As a result, the froth may be drawn into the flow passage under the Venturi effect and/or a jet stream effect.

In an alternative embodiment of the invention, the froth may be introduced to the fluid flowing through the housing at a relatively low angle. It is envisaged that, in this embodiment, the flow of froth and the flow of fluid may be as close to parallel as possible when the froth is introduced into the fluid. Thus, the froth may be introduced to the fluid at an angle of between 0° and 45°. More preferably, the froth may be introduced to the fluid at an angle of between 0° and 30°. Still more preferably, the froth may be introduced to the fluid at an angle of between 0° and 20°. Yet more preferably, the froth may be introduced to the fluid at an angle of between 0° and 10°.

The flow passage and the inlet conduit may be located in any suitable orientation to the ground. For instance, the inlet conduit may be positioned substantially vertically, substantially horizontally, or in any other suitable orientation. It will be understood that the orientation of the housing to the ground is not critical to the invention: instead it is the orientation of the opening (or inlet conduit) to the flow passage that is of more importance.

Preferably, the opposed ends of the flow passage are open, such that a first end of the flow passage acts as an inlet for the fluid, while an opposed second end of the flow passage acts as an outlet for the mixture of fluid and entrained gas. Fluid may enter the inlet of the flow passage from any suitable source. For instance, the fluid may be sourced from a tap, hose, water line, gas tank or cylinder, or the like. Alternatively, the fluid may be sourced from the vessel or another process vessel.

The mixture of fluid and entrained gas exits the flow passage through the outlet. After exiting the flow passage, the mixture may be returned to the vessel or may be transferred to another location within a processing circuit, such as a processing vessel, holding tank or the like. The mixture may be transferred using any suitable technique. For instance, the mixture may be pumped or gravity fed to another location within a processing circuit, or may be transferred using the pressure of the liquid flowing through the flow passage. In this embodiment of the invention, it is envisaged that the flow of fluid through the flow passage will transfer the mixture to another location within the processing circuit (i.e. transfer of the fluid occurs without the use of a mechanical device, such as a pump).

In a preferred embodiment of the invention, the mixture is returned to the vessel. The mixture may be returned to any suitable part of the vessel, although in a preferred embodiment the mixture may be returned to an upper region of the vessel through a return line. More specifically, the mixture may be returned to the top of the vessel through a return line. In some embodiments, an outlet of the return line may be provided with a nozzle such that the mixture is returned to the vessel in a spray. This may assist in breaking the froth remaining within the vessel and/or preventing the re-formation of froth. Any suitable nozzle may be provided, and the exact nature of the nozzle is not critical to the invention.

It is envisaged that, as the mixture is either returned to the vessel or discharged into a vessel in another part of the processing circuit, a froth may re-form on the surface of the slurry. However, the re-formed froth will have a much lower volume than the froth removed from the vessel. In addition, the re-formed froth may be considerably less stable or more brittle than the froth removed from the vessel, meaning that the bubbles in the froth may break within a short period of time.

It is envisaged that, in some embodiments of the invention, particles may also become entrained in the mixture. For instance, in mineral processing applications, the froth may include mineral particles that are attached to the gas bubbles in the froth. A similar phenomenon may be experienced in pharmaceutical applications. Thus, the mixture may comprise fluid, entrained gas and entrained solid particles.

It is envisaged that the additional fluid (such as water) introduced to the processing circuit through the flow passage will be offset by a reduction in fluid additions in other downstream parts of the circuit. In this way, the fluid balance within a processing circuit may be substantially maintained.

In mineral processing circuits, the dilution of the slurry stream through water addition in the flow passage is likely to result in improved froth flotation performance for the same volume of water added prior to the next stage of froth flotation in comparison to conventional practice in which water is added directly to the feed of the next flotation cell or bank. This improved froth flotation performance results in improved valuable mineral recovery, reduction in the entrainment of gangue and so on.

As previously mentioned, froth may be drawn into the housing directly from the vessel. In this embodiment of the invention, the froth may be extracted from the vessel at any suitable height within the vessel. Preferably, however, the froth is extracted from the vessel at a point at which significant froth exists in the vessel. More preferably, the froth may be extracted from a point in the vessel that is located vertically higher within the vessel than the point at which liquid and/or froth is extracted for pumping. In this way, froth extraction may be maximised and extraction of liquid from within the vessel may be minimised. In addition, the amount of froth extracted by the pump may be reduced.

In some embodiments of the invention, two housings may be associated with the vessel. In this embodiment of the invention, it is envisaged that a first housing may be associated with a pump and may be adapted to extract froth from the pump and/or from a suction spool between the vessel and a pump, while a second housing may be adapted to extract froth directly from the vessel. In this way, the removal of gas from the froth may be improved by removing gas from the froth at two separate locations.

Any suitable gas may be removed from the froth, and it will be understood that the type of gas will depend on the application in which the invention is being used. For instance, in froth flotation, the gas may be air, oxygen, nitrogen or the like. In other embodiments, the gas may be carbon dioxide, carbon monoxide, hydrogen sulphide or the like, or any combination thereof.

The present invention provides a number of significant advantages over the prior art. For instance, the use of the present invention provides an energy saving in comparison to applications in which impellers are used to physically break froth in a vessel. The present invention also provides improved froth control and improved pump performance.

In mineral processing applications, the breaking of bubbles in the froth using the present invention ensures that fine particles are returned to the slurry prior to undergoing further froth flotation, thereby improving recovery of fine, liberated mineral particles. This may also result in an increase in the grade of the slurry (i.e. the concentration of valuable mineral within the slurry). Similarly, this results in improved rejection of gangue materials (such as silica) due to reduced entrainment of these materials in the froth. Further, the present invention provides improved mixing, dilution and cleaning of slurries.

Other advantages include a reduction in reagent usage in downstream parts of the processing circuit, reduced residence times and improved response to reagents. In addition, in mineral processing circuits, a reduction in the amount of froth leaving a froth flotation circuit can reduce froth build-up on the surface of thickeners, leading to improved thickener overflow water quality and reduced flocculent reagent consumption. The present invention also assists with the dilution process ahead of a thickener feed well flocculent addition.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
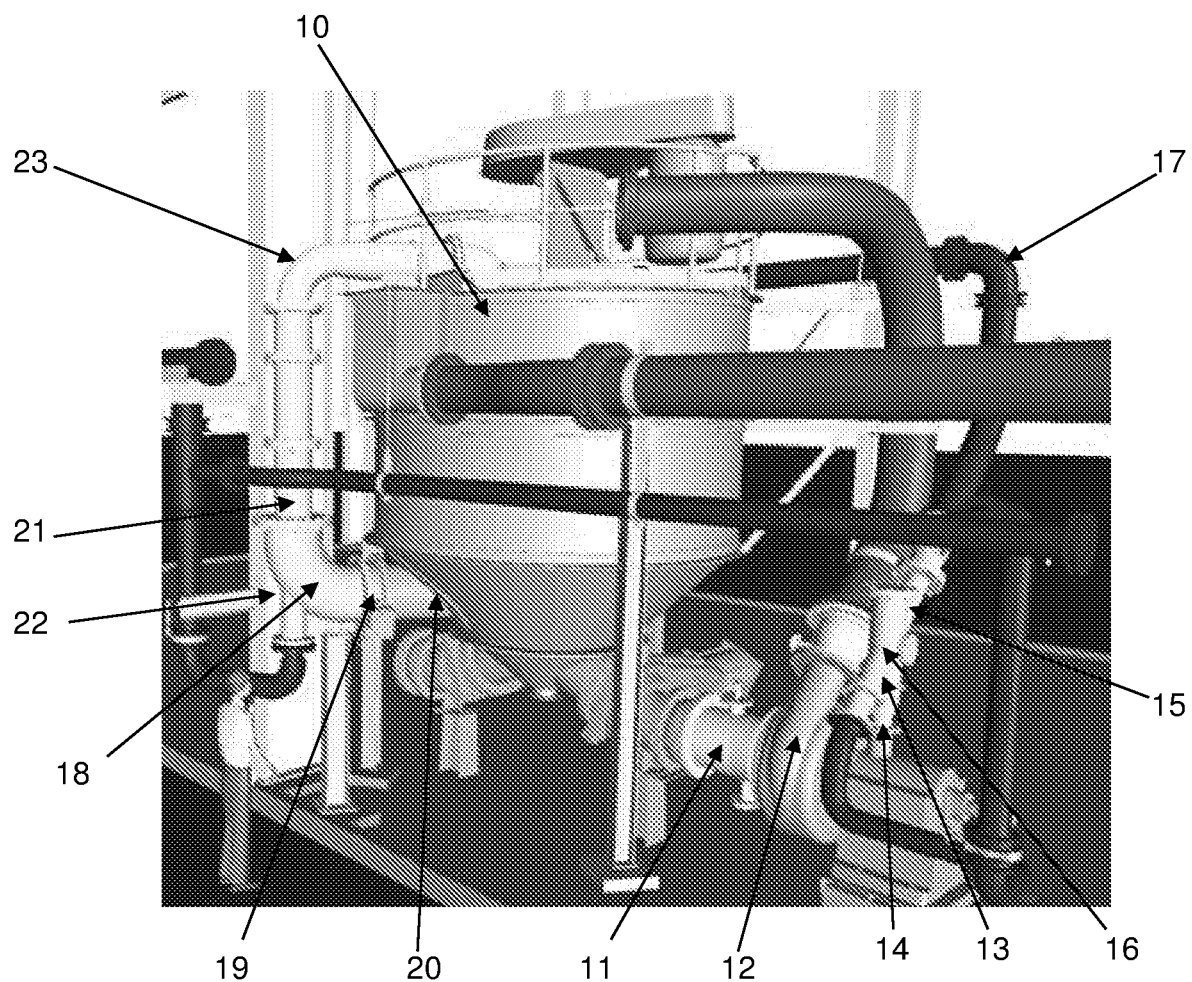
FIG. 1 illustrates an isometric view of a process vessel wherein the method according to an embodiment of the present invention is in use.

In FIG. 1 there is shown an isometric view of a process vessel 10 wherein the method of the present invention is in use. The process vessel 10 of FIG. 1 is a froth flotation pumpbox in which slurry from a flotation cell (not shown) is received prior to being pumped to another part of the processing circuit. On top of the slurry is a stable froth. It will be understood that when the term "froth" is used hereinafter, it refers either to froth or to a mixture of slurry and froth. It will also be understood that the slurry may also include a froth component, with the density of the slurry being higher than the density of the froth on top of the slurry.

Froth, or a mixture of froth and slurry, is extracted from the vessel 10 through pipe 11 so that it may be pumped to another location in the processing circuit via centrifugal pump 12. It should be noted that the pipe 11 also functions as the pump spool. However, in situations in which large amounts of froth, or particularly stable froth, is present within the vessel 10, pumping the froth may be difficult and air locking may occur within the pump 12. In the pump spool 11, the mixture of slurry and froth is conditioned, with the highly aerated froth being driven to the centre of the spool to maximise deaeration.

Thus, in the present invention a housing 13 is provided. An opening (obscured) is provided in the casing of the pump 12 and the housing 13 is connected thereto via inlet conduit 14. Thus, the housing 13 is in fluid communication with the interior of the pump 12 via inlet conduit 14. A portion of the froth entering the pump 12 from the vessel 10 is extracted from the pump 12 through inlet conduit 14 and enters the housing 13.

The housing 13 includes a transverse portion through which a flow of water is provided (i.e. the flow passage 15). The flow passage 15 includes a restricted portion 16 of smaller diameter than the remainder of the flow passage 15. Thus, as water flows through the restricted portion 16, a low pressure zone or partial vacuum is created within the housing 13. The creation of this low pressure zone draws froth into the flow passage 15 through the inlet conduit 14 under the Venturi and/or jet stream effects. As froth is drawn into the flow passage 15, bubbles in the froth break and air (and any solid particles attached to the bubbles) is entrained in the flow of water through the flow passage 15. In this way, even bubbles in overly stable froths may be broken.

In the embodiment of the invention shown in FIG. 1, the mixture of water and entrained air and solids is returned to the vessel 10 via pipe 17. The return of this mixture to the vessel 10 means that the ratio of slurry to froth in the vessel 10 is increased, reducing pumping problems, and improving the dilution of the slurry (which may be beneficial for valuable mineral recovery and gangue rejection in subsequent flotation cells or banks). In another embodiment, if dilution of the slurry in vessel 10 should be avoided, the mixture of water, solids and entrained air may be sent to a separate tank, with some of the liquid from the tank 10 being returned to vessel 17 and other liquid from the tank being used as the liquid fed to the de-aerator, by feeding that liquid to the flow passage 15.

The return of the mixture to the vessel 10 through pipe 17 may also serve to assist with breaking bubbles in the froth still remaining in the vessel 10. To further assist with this, pipe 17 may be provided with a spray nozzle or spray head (not shown) to assist with bubble breakage in the vessel 10. The use of a spray nozzle or spray head (not shown) may also assist in releasing entrained air from the returned mixture, thus reducing or eliminating the return of air to the vessel 10.

In another embodiment of the invention, a second housing 18 is provided. The second housing 18 is in direct fluid communication with the vessel 10 via inlet conduit 19.

An opening 20 is provided in the wall of the vessel 10 and the second housing 18 is connected thereto via inlet conduit 19. All of the froth exiting the vessel 10 through inlet conduit 19 enters the housing 18.

The housing 18 includes a transverse portion through which a flow of water is provided (i.e. the flow passage 21). The flow passage 21 includes a restricted portion 22 of smaller diameter than the remainder of the flow passage 21. Thus, as water flows through the restricted portion 22, a low pressure zone or partial vacuum is created within the housing 18. The creation of this low pressure zone draws froth into the flow passage 21 through the inlet conduit 19 under the Venturi effect and/or a jet stream effect. As froth is drawn into the flow passage 21, bubbles in the froth break and air (and any solid particles attached to the bubbles) is entrained in the flow of water through the flow passage 21. In this way, even bubbles in overly stable froths may be broken.

In the embodiment of the invention shown in FIG. 1, the mixture of water and entrained air and solids is returned to the vessel 10 via pipe 23. The return of this mixture to the vessel 10 means that the ratio of slurry to froth in the vessel 10 is increased, reducing pumping problems, and improving the dilution of the slurry (which may be beneficial for valuable mineral recovery and gangue rejection in subsequent flotation cells or banks).

The return of the mixture to the vessel 10 through pipe 23 may also serve to assist with breaking bubbles in the froth still remaining in the vessel 10. To further assist with this, pipe 23 may be provided with a spray nozzle or spray head (not shown) to assist with bubble breakage in the vessel 10 and also the release of entrained air from the mixture.

Figure 2:
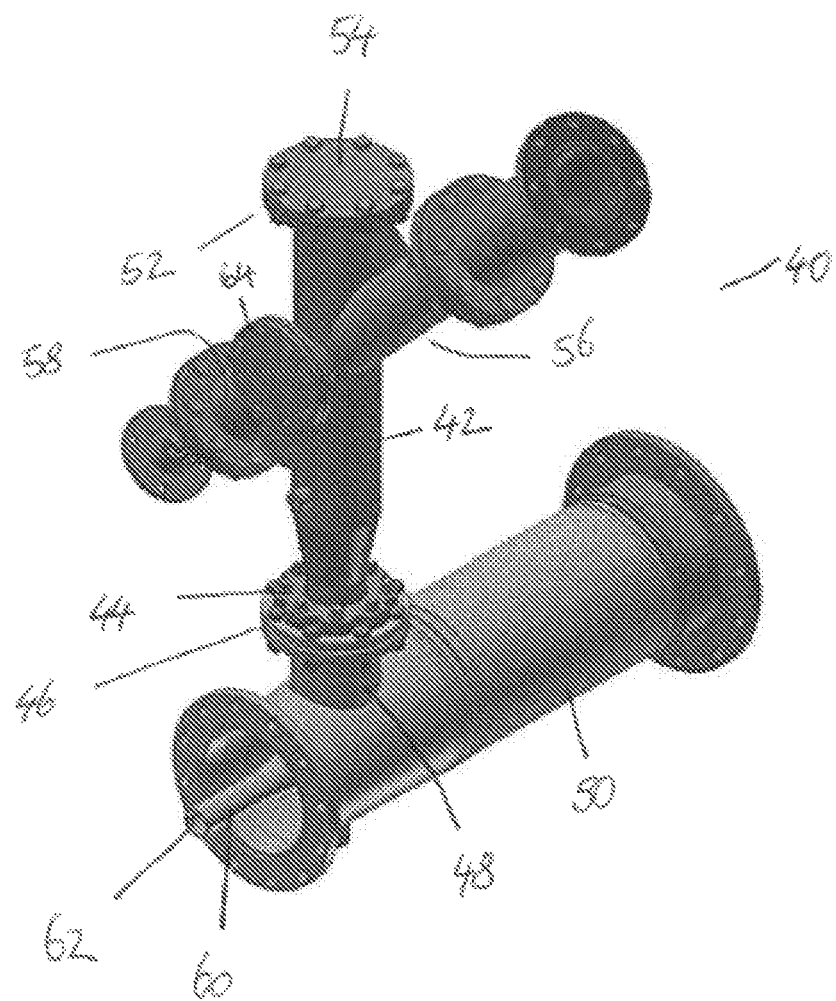
FIG. 2 shows a perspective view of an apparatus in accordance with the present invention.

FIG. 2 shows a perspective view of an apparatus in accordance with the present invention, with the apparatus being connected to a pump spool. The apparatus 40 shown in FIG. 2 comprises a housing 42 having a flange 44 at its lower end. The flange 44 enables the apparatus 42 be bolted to a flange 46 located on a small riser pipe 48 extending from a pump spool 50. Pump spool 50 is positioned directly upstream of the inlet to a centrifugal pump.

The housing 42 includes a central flow passage. The upper end 52 of the housing is closed by a cap 54 such that liquid cannot pass out of the upper end 54. The apparatus 40 further includes a flow passage formed by angled pipes 56 and 58. As can be seen from FIG. 2, angled pipes 56 and 58 extend at an angle of around 45° to the longitudinal axis of housing 42. The side wall of housing 42 is open at the positions where angled pipes 56 and 58 are connected to the housing 42. In this manner, the angled pipes 56, 58 are in fluid communication with the internal volume of the housing 42. Appropriate flanges (which are shown in FIG. 2 but not numbered) enable the pipes 56, 58 to be connected to a source of flowing liquid, such as a pipeline. The device 40 includes a conduit that is located near a central region of the pump spool 50. Conduit 60 has an opening 62. Conduit 60 extends through a right angle elbow up into the housing 42. In this manner, the conduit 60 comprises an inlet conduit for the apparatus 40. The conduit 60 has an outlet located in the housing 42. The outlet of the conduit 60 may be located near the height of the pipe 56 or the pipe 58.

In use, froth from the pump spool enters into outlet 62 of conduit 60. The froth flows along the conduit 60 and up into the housing 42. Pressurised liquid is supplied to pipe 58, which causes the pressurised liquid to flow along pipe 58, into the housing 42 and out of the housing 42 via a pipe 56. This sets a flow of liquid up through pipes 58 and 56 and through the upper part of the housing 42. As a result of that flow, froth in the conduit 60 becomes entrained in the flow of liquid. This causes bubbles in the froth to break down, thereby releasing air from the froth. The housing 42 may be provided with a flow restriction near the location where pipe 58 enters into the housing 42. This may assist in forming a low pressure area caused by the flow of liquid from pipe 58 due to the venturi effect. This low pressure region may assist in extracting froth from the pump spool 50 into the housing 42.

The apparatus 40 may also be provided with an inspection port 64 to enable the apparatus to be inspected and to provide access for any maintenance or clear that may be required for the housing 42 near the vicinity of the pipes 56 and 58.

In another embodiment, the conduit 60 may be omitted, with froth in the pump spool entering the housing 42 via an opening at the lower end 44 of the housing 42.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A method for removing gas from a froth comprising the steps of supplying at least a portion of the froth from a vessel into a central passage of a housing, the housing having the central passage and a transverse flow passage, the transverse flow passage extending tansversely to and through the center passage, providing a flow of liquid through the transverse flow passage in the housing, whereby at least a portion of the gas in the froth is removed from the froth and entrained in the liquid to form a mixture of fluid and entrained gas, and subsequently delivering the mixture of liquid and entrained gas to the vessel and/or another location within a processing circuit.

2. A method according to claim 1 wherein the vessel is a processing vessel or a storage or holding vessel.

3. A method according to claim 1 wherein the vessel contains a slurry of solid particles in liquid topped with the froth.

4. A method according to claim 1 wherein the froth enters the housing from the vessel through an opening in, or inlet conduit associated with, the housing.

5. A method according to claim 4 wherein a pump is located between the vessel and the housing, such that the froth is transferred from the vessel to the pump and at least a portion of the froth is extracted from the pump to the housing.

6. A method according to claim 5 wherein the froth is extracted from a suction spool of the pump.

7. A method according to claim 6 wherein the froth is extracted from a point at or adjacent a centre of the suction spool.

8. A method according to claim 1 wherein the vessel comprises a thickener.

9. A device for removing gas from a froth, the device comprising a housing including an inlet conduit adapted, at a first end thereof to be located in fluid communication with a suction spool of a pump, the suction spool of the pump receiving froth from a vessel, the housing comprising a central passage and a transverse flow passage, the transverse flow passage extending transversely to and through the central passage, the transverse flow passage being in fluid communication with an opposed second end of the inlet conduit, wherein, when a flow of liquid is provided through the flow passage, the froth is introduced into the liquid through the inlet conduit such that at least a portion of the gas in the froth is removed from the froth and entrained in the liquid to form a mixture of fluid and entrained gas.

10. A device according to claim 9 wherein the pump comprises a centrifugal pump having an impeller.

11. A device according to claim 9 wherein the liquid fluid comprises water or a slurry.

12. A device according to claim 9 wherein the froth is introduced to the liquid fluid flowing through the housing at an angle of between 0° and 20°.

13. A device according to claim 9 wherein the flow passage includes a restricted portion therein.

14. A device according to claim 13 wherein the second end of the inlet conduit is located within the restricted portion.

15. A device according to claim 9 wherein the froth is introduced to the flow passage under the Venturi effect and/or a jet stream effect.

16. A device according to claim 9 wherein the flow passage includes a first end adapted to act as an inlet for the liquid fluid, and an opposed second end adapted to act as an outlet for the mixture of fluid and entrained gas.

17. A device according to claim 16 wherein the transverse flow passage has an outlet in fluid communication with the vessel.

18. A device according to claim 17 wherein the mixture of fluid and entrained gas is returned to the vessel through a return line.

19. A device according to claim 18 wherein an outlet of the return line is provided with a nozzle such that the mixture is returned to the vessel in a spray.

* * * * *